United States Patent [19]

Kam et al.

[11] 4,218,720
[45] Aug. 19, 1980

[54] TELEVISION RECEIVER PICTURE TUBE PROTECTION CIRCUIT

[75] Inventors: George H. Kam, Tonawanda; John D. Lovely, Batavia, both of N.Y.

[73] Assignee: GTE Products Corporation, Stamford, Conn.

[21] Appl. No.: 13,851

[22] Filed: Feb. 22, 1979

[51] Int. Cl.³ .............................................. H02H 3/08
[52] U.S. Cl. ...................................... 361/93; 361/91; 315/30; 315/411; 358/74; 358/190; 358/243
[58] Field of Search ....................... 361/93, 94, 91, 57, 361/18, 88; 315/30, 411; 358/74, 190, 218, 219, 243, 245

[56] References Cited

U.S. PATENT DOCUMENTS

| | | | |
|---|---|---|---|
| 3,612,756 | 10/1971 | Akatsu et al. | 358/74 |
| 3,619,705 | 11/1971 | Waybright | 358/243 |

Primary Examiner—Patrick R. Salce
Attorney, Agent, or Firm—Theodore D. Lindgren

[57] ABSTRACT

A protection circuit for television receiver picture tubes and related components which includes a diode which is forward biased during normal operation to provide coupling of the tube control grid to ground or reference potential and which is reverse biased during operation at excessively large beam currents, the reverse biasing of the diode causing the beam current to flow through a large grid-cathode resistor thereby effectively limiting electron beam current.

6 Claims, 4 Drawing Figures

TELEVISION RECEIVER PICTURE TUBE PROTECTION CIRCUIT

TECHNICAL FIELD

This invention relates to a television receiver circuit for prevention of damage to the television picture tube and related components caused by power supply breakdown or video circuit faults.

BACKGROUND ART

The cathode-ray tube is the most expensive component used in a color television receiver and damage to it may result in a major repair bill amounting to 25% or more of the initial cost of the receiver. The second most expensive component is the flyback transformer.

For picture tube protection most receivers employ a beam current limiting mechanism which senses the average picture tube beam current. When a pre-determined average beam current is reached circuits are activated which limit the level of the input signal to the video drive amplifier stages and hence the average beam current. However, the protection supplied by such circuits does not extend to a failure occurring in the video amplifier stages located down-stream in the signal path from the point at which the beam current limiting signal is applied. If the failure causes an increase in the cathode drive the resulting increase in beam current may damage or shorten the life of the picture tube. Such damage may occur before the primary overload protection circuits or devices are activated. Such circuits and devices are usually comprised of fuses, thermal cut-outs and crowbar circuits which are designed to protect against fire hazards resulting from catastrophic component failures. Fuses and other similar protection systems used in the receiver cannot be set to trip reliably with relatively small increased increments of power consumption. Attempts to design a fuse-type system to protect against occasional power surges would result in annoying and costly service calls. In general, attaining accurate and reliable protection using overload-sensing circuits is difficult because of component and production tolerances.

One of the requirements for a high performance television receiver is the maintenance of a small focussed spot during the electron beam scan of peak white areas of the picture. The peak white areas of the picture require high beam currents. While many problems are encountered in the attainment of the small focussed spot, one of the most fundamental problems is that of providing the power demands of the picture tube during the white highlights consistent with allowable limits for dissipation and x-radiation. In general, the solution to the problem requires the use of low impedance power supplies to deliver the necessary power during periods of high beam current to aid in maintaining essentially constant operating voltages. The use of a low impedance high voltage power supply for the electron beam current increases the probability of damage to the picture tube and supply during fault conditions.

DISCLOSURE OF THE INVENTION

This invention discloses a circuit which provides inherent protection of the picture tube from damage caused by excessively large beam currents, and also provides protection for the flyback transformer which would otherwise be required to supply the excessively large beam currents.

The disclosed circuit is comprised in part of a diode which is forward biased during normal operation, effectively grounding the control grid. The diode is reverse biased by operation at a beam current which exceeds a predetermined value. The reverse bias voltage across the diode removes the effective ground connection of the control grid and simultaneously causes the beam current to flow through a biasing resistor resulting in a bias voltage between the control grid and the cathode which limits the beam current to a predetermined value.

BEST MODE FOR CARRYING OUT THE INVENTION

Figure 1:
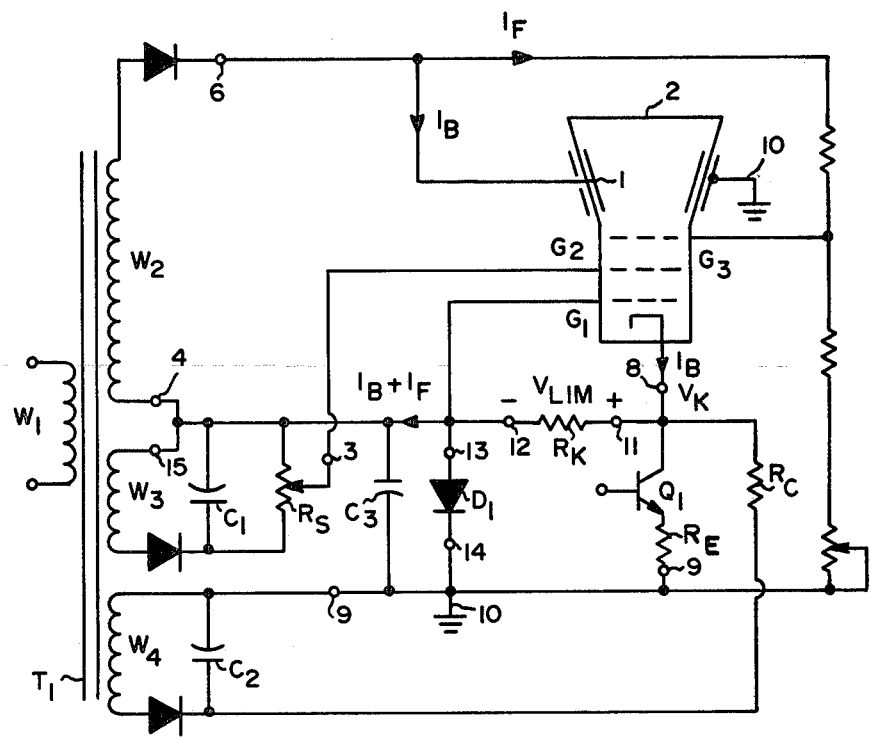
FIG. 1 is an abbreviated circuit diagram for a part of a television receiver and is used to illustrate operation of the circuit of this invention.

FIG. 1 is a schematic of a part of a television receiver circuit and illustrates modifications thereto which relate to the application of this invention. Flyback transformer $T_1$ supplies power to the anode 1 of cathode ray picture tube 2 from secondary anode voltage supply winding $W_2$. Primary winding $W_1$ is driven with the flyback pulses of the television horizontal deflection circuit, which is not shown. Secondary screen voltage supply winding $W_3$ provides second or screen grid $G_2$ with a d-c voltage which may, for example, be approximately 800 volts. Secondary winding $W_4$ provides video output amplifier $Q_1$ and other television receiver circuits with a d-c voltage which may be in the range of 200 to 300 volts. Capacitors $C_1$ and $C_2$ are filter capacitors. The picture tube anode supply filter capacitor may be provided by the internal and external aquadag coatings of the tube surfaces.

It should be noted that secondary winding of anode voltage supply means $W_2$ may take the form of segmented windings with series-connected diodes or may include a tripler circuit according to common design practices.

During normal operation the current through resistive means $R_K$ and unidirectional coupling means $D_1$ is sufficient to keep means $D_1$ in conduction, thus clamping the lower end of anode voltage supply means $W_2$ and control grid $G_1$ to a fraction of a volt above reference voltage or ground. This fraction of a volt which is equal to one forward diode voltage drop has negligible effect on the operation of the circuit. One end of screen voltage supply means $W_3$ is also connected to the anode of diode $D_1$ and is therefore also normally clamped to ground.

The forward biasing current of diode $D_1$ during normal operation of the television receiver has an average value approximately equal to average value of collector voltage $V_K$ divided by the chosen value of resistive means $R_K$. The reverse biasing current of diode $D_1$ is less than the forward biasing current during such normal operation and is approximately equal to the sum of the beam current $I_B$ and the focus supply current $I_F$. The value of current $I_F$ may be considered as being negligible with respect to the value of current $I_B$ and will not be included in subsequent discussion. During said normal operation, the current $I_B$ primarily follows a return path from the cathode of tube 2 to the lower end of means $W_2$ through the low output impedance of the amplifier comprised of transistor $Q_1$ and of resistors $R_C$ and $R_E$ rather than a return path through the relatively large-valued resistive means $R_K$. The value of current $I_B$ is determined by the voltage-controlled current source comprised of the preferably low-impedance high voltage supply, of the high internal impedance of the picture tube and of the grid-cathode voltage applied to the picture tube.

The protection circuit remains inoperative while diode $D_1$ is forward-biased thereby causing end 4 of means $W_2$ and grid $G_1$ to be clamped to ground. When the beam current $I_B$ becomes sufficiently large that the forward bias current is cancelled, diode $D_1$ becomes reversed biased. The beam current limiting circuit is then activated. Anode voltage supply means $W_2$ and grid $G_1$ which are connected to diode $D_1$ become unclamped from the reference potential and the voltage across resistor $R_K$ increases as a result of the beam current $I_B$ which must now pass through resistor $R_K$. This increased voltage limits the beam current $I_B$ because the increase causes grid $G_1$ to become more negatively charged with respect to the cathode of tube 2. For example, if the beam current $I_B$ is to be limited to 2 milliamperes, the value of $R_K$ may be chosen to limit the current to that value. The chosen value of $R_K$ may be calculated using the nonlinear voltage-current characteristics for a given type of picture tube as published for particular values of screen and anode voltages. If, by way of example, the tube characteristics indicate that a grid-cathode voltage $V_{LIM}$ equal to 136 volts results in the desired beam current limit of 2 milliamperes, then the value chosen for $R_K$ should be 136 volts divided by 0.002 amperes or 68 Kilohms. The calculated value of $R_K$ is typically an order of magnitude larger than the low output impedance of the $Q_1$ amplifier, as is required for operation of the protection circuit.

The activated picture tube protection circuit operates in a manner similar to that of a vacuum tube circuit having a very high cathode self bias resistor. A small cathode or beam current $I_B$ provides sufficient voltage $V_{LIM}$ across the cathode resistor $R_K$ to maintain the television picture tube in the current-limited mode of operation.

Optional capacitor $C_3$ may be connected in parallel with diode $D_1$ for the purpose of bypassing or filtering variations in voltage across the diode caused by flyback pulses and by the video signal, thus causing the protection circuit to operate only during periods of high average beam current.

Diode $D_1$ may be chosen to have a zener voltage which is lower than the working voltage of capacitor $C_3$ to protect capacitor $C_3$ from large negative voltages which occur in the event that the picture tube anode supply voltage is accidentally grounded.

It is noted that in the circuit of FIG. 1 screen voltage supply means $W_3$ has a first screen supply terminal 3 tapped from resistor $R_S$ and coupled to screen grid terminal $G_2$ of tube 2. The other end of means $W_3$ or the second screen supply terminal 15 may be coupled to the forward conducting terminal 13 of diode $D_1$. The optional connection causes a change in the voltage $V_{LIM}$ across resistor $R_K$ to simultaneously affect the voltages applied to both grid terminals $G_1$ and $G_2$. That is, an increasingly negative increment of voltage applied to grid $G_1$ is also applied to grid $G_2$, resulting in a lower value of beam current necessary to maintain the picture tube in current-limited operation. Alternatively, however, the circuit will operate without the optional connection and with second screen supply terminal 15 of means $W_3$ connected to ground or reference potential rather than to the anode of diode $D_1$ as indicated.

It is also noted that the connection of one end of resistor $R_K$ to the collector terminal of transistor $Q_1$ not only provides protection against collector breakdown of transistor $Q_1$ but also results in increased threshold sensitivity for operation of the protection circuit by lowering the forward bias current through $R_K$ and diode $D_1$.

Figure 2:
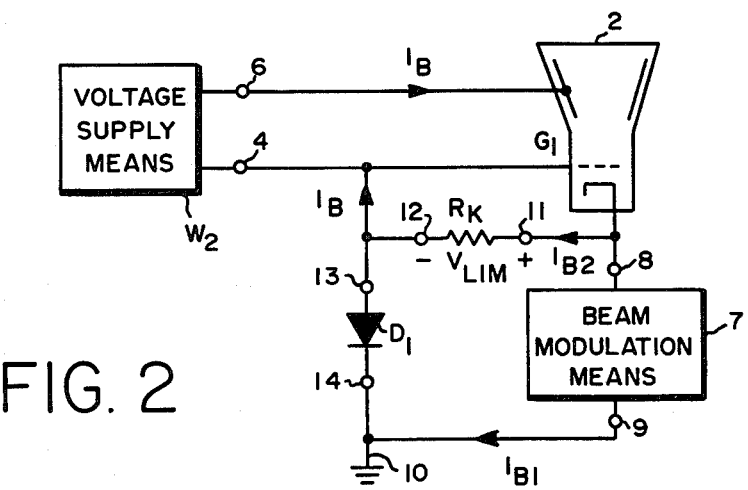
FIG. 2 shows the basic circuit of the invention in block diagram form.

FIG. 2 indicates the protection circuit of this invention in less detailed form. Voltage supply $W_2$ is completed of the various windings of $T_1$ and associated filter circuitry. Terminals 4 and 6 correspond to the output terminals of anode voltage supply means $W_2$ and are the first and second anode supply terminals for pictorial display means or picture tube 2. Terminal 6 is coupled to the anode terminal of tube 2. Beam modulation means 7 has first and second output terminals 8 and 9 which correspond to terminals of amplifier $Q_1$. Modulation means 7 must have a low impedance direct current path between terminals 8 and 9 for proper operation of the circuit. That is, the impedance should be on the order of one-tenth of the value of resistor $R_K$. Terminal 8 is coupled to the cathode terminal of display means 2. Terminal 9 is coupled to a source of reference potential 10 shown as ground. Resistive means $R_K$ has a first impedance terminal 11 coupled to the cathode terminal of display means 2 and a second impedance terminal 12 coupled to the grid terminal $G_1$ of means 2 and terminal 4 of supply means $W_2$. Unidirectional coupling means $D_1$, shown as a diode, has a forward terminal 13 and a reverse terminal 14. Forward terminal 13 is coupled to second impedance terminal 12 and reverse terminal 14 is coupled to reference potential 10. Current component $I_{B1}$ indicates the conduction path for beam current $I_B$ during normal operation. Current component $I_{B2}$ indicates the path of beam current flow during current limiting operation.

Figure 3:
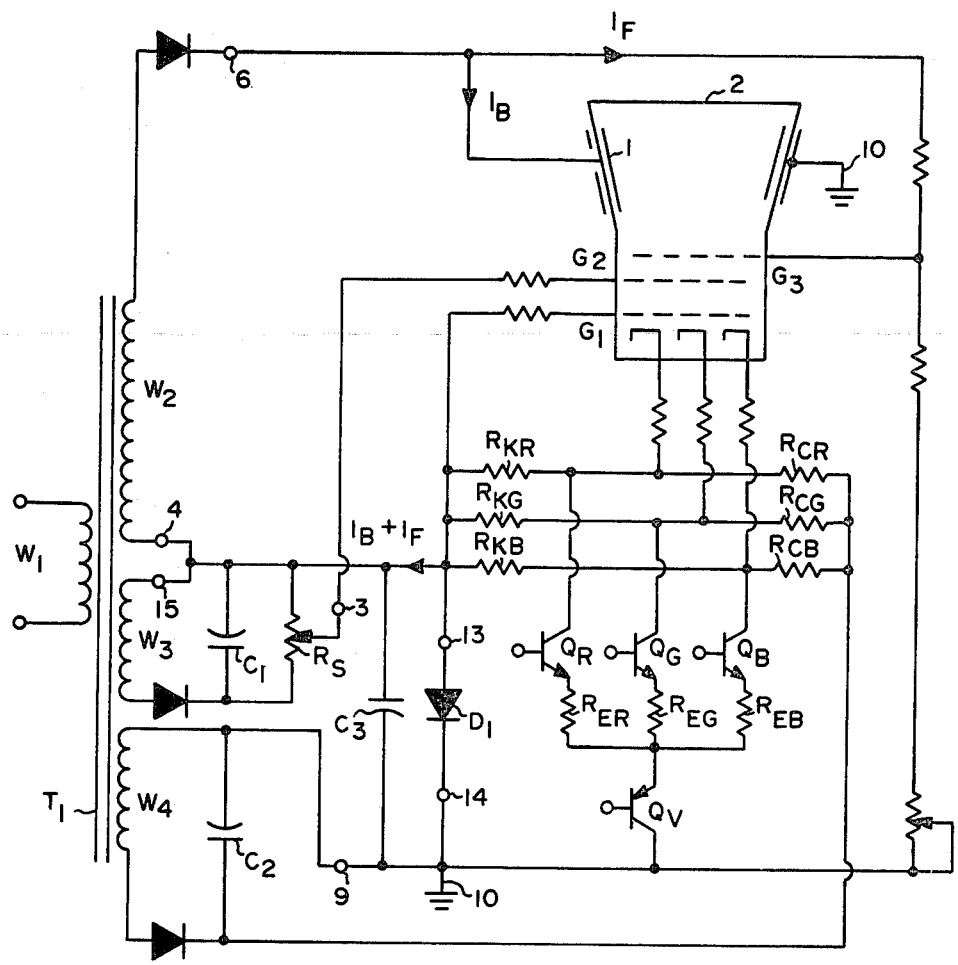
FIG. 3 is a partial circuit diagram for a color television receiver illustrating a preferred mode of operation.

FIG. 3 illustrates use of the circuit for protection of color television receiver picture tubes and associated components. As explained in the description of the circuit of FIG. 1, the different models of television receivers use variations from the circuit illustrated not only for voltage supplies and focus voltage adjustments, but also for screen grid configurations and corresponding screen and focus voltage controls. However, in the circuit of FIG. 3 components are labeled as in FIG. 1 with the exception of individual driving amplifiers for the red, green and blue amplifiers $Q_R$, $Q_G$ and $Q_B$ and with the exception of video driver $Q_V$. The amplifiers have low output impedance and the values of resistors $R_{KR}$, $R_{KG}$ and $R_{KB}$ are relatively large and may be equal to each other. In one application values of resistors $R_{KR}$, $R_{KG}$ and $R_{KB}$ were equal to 220 Kilohms for a predetermined maximum value of total beam current equal to 1.8 milliamperes.

Figure 4:
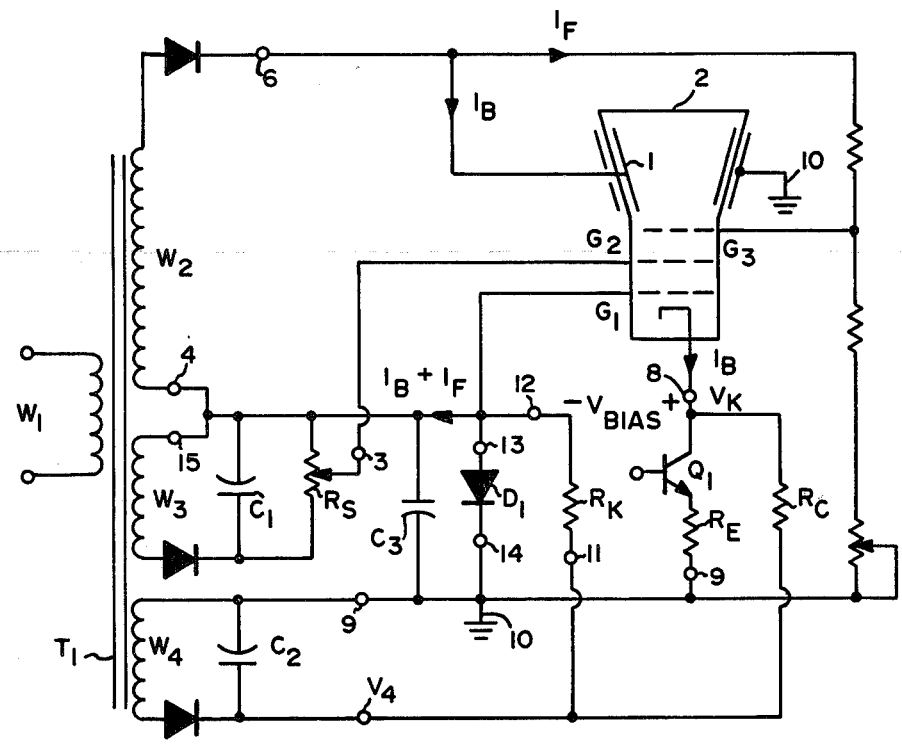
FIG. 4 indicates an alternate embodiment of the invention.

FIG. 4 illustrates another embodiment of the invention. In the embodiment first impedance terminal 11 of resistive means $R_K$ is connected directly to the positive sound of d-c potential $V_4$ provided by winding $W_4$ of transformer $T_1$. The net current flowing in the forward direction through unidirectional coupling means $D_1$ is comprised of a forward current component determined by dividing the power supply potential $V_4$ by the chosen value of $R_K$ and is comprised of an oppositely directed current component due to the beam current $I_B$ and the relatively small beam focusing current $I_F$. Therefore, the value of $R_K$ is chosen such that the forward current component is equal to the value of beam current at which limiting operation of the circuit is to commence. Using that value for $R_K$, diode $D_1$ is reverse-biased by an excessive beam current component. The beam current then flows through resistor $R_K$. This current, being greater than the normal current through resistor $R_K$, causes the voltage at grid $G_1$ to become more negative with respect to the cathode voltage $V_K$, thereby limiting the beam current.

Because the disclosed protection circuit operates directly on the picture tube electrodes, requires few parts and does not employ active devices, it therefore is reliable as well as inexpensive. The beam current can be limited to maintain the picture tube operation below its x-radiation isoexposure rate limit curve, even under fault conditions.

While there has been shown and described what are at present considered the preferred embodiments of the invention it will be obvious to those skilled in the art that various changes and modifications may be made therein without departing from the invention as defined by the appended claims.

We claim:

1. An improved protection circuit for a television receiver which is comprised in part of a pictorial display means having an anode terminal, a control-grid terminal and at least one cathode terminal; a source of reference potential; a d-c anode voltage supply means having first and second anode supply terminals wherein said first anode supply terminal is coupled to said anode terminal; a beam modulation means having at least first and second output terminals wherein said first output terminal is coupled to said cathode terminal and wherein said second output terminal is coupled to said reference potential, said first output terminal having an average value of voltage greater than said reference potential, said beam modulation means having a low-impedance direct-current path between said first and second output terminals; said protection circuit characterized by a unidirectional coupling means, having a forward terminal and a reverse terminal wherein said reverse terminal is coupled to said reference potential, and by a resistive means having first and second impedance terminals wherein said first impedance terminal is coupled to said cathode terminal and wherein said second impedance terminal is coupled to said forward terminal, said second anode supply terminal and said grid terminal.

2. The protection circuit of claim 1 wherein said pictorial display means has a screen grid terminal and said television receiver is further comprised of a d-c screen voltage supply means having first and second screen supply terminals with said first screen supply terminal coupled to said screen grid terminal characterized by said second screen supply terminal coupled to said forward terminal of said directional coupling means.

3. The protection circuit of claim 1 characterized by a capacitor connected between said forward terminal and said reverse terminal.

4. An improved protection circuit for a television receiver which is comprised in part of a pictorial display means having an anode terminal, a control-grid terminal and at least one cathode terminal; a source of reference potential; a source of d-c potential which is positive with respect to said reference potential; a d-c anode voltage supply means having first and second anode supply terminals wherein said first anode supply terminal is coupled to said anode terminal; a beam modulation means having at least first and second output terminals wherein said first output terminal is coupled to said cathode terminal and wherein said second output terminal is coupled to said reference potential, said beam-modulation means having a low-impedance direct-current path between said first and second output terminals; said protection circuit characterized by a unidirectional coupling means having a reverse terminal and a forward terminal wherein said reverse terminal is coupled to said reference potential and by a resistive means having first and second impedance terminals wherein said first impedance terminal is coupled to said source of d-c potential and wherein said second impedance terminal is coupled to said forward terminal, said second anode supply terminal and said grid terminal.

5. The protection circuit of claim 4 wherein said pictorial display means has a screen grid terminal and said television receiver is further comprised of a d-c screen voltage supply means having first and second screen supply terminals with said first screen supply terminal coupled to said screen grid terminal characterized by said second screen supply terminal coupled to said forward terminal of said directional coupling means.

6. The protection circuit of claim 4 characterized by a capacitor connected between said forward terminal and said reverse terminal.

* * * * *